US008050373B2

(12) United States Patent
Buchwald et al.

(10) Patent No.: US 8,050,373 B2
(45) Date of Patent: Nov. 1, 2011

(54) PHASE INTERPOLATOR BASED TRANSMISSION CLOCK CONTROL

(75) Inventors: Aaron W. Buchwald, Newport Coast, CA (US); Michael Le, Laguna Niguel, CA (US); Hui Wang, Irvine, CA (US); Howard A. Baumer, Laguna Hills, CA (US); Pieter Vorenkamp, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1146 days.

(21) Appl. No.: 10/876,602

(22) Filed: Jun. 28, 2004
(Under 37 CFR 1.47)

(65) Prior Publication Data
US 2005/0286669 A1 Dec. 29, 2005

(51) Int. Cl.
*H04L 7/00* (2006.01)
(52) U.S. Cl. ........ 375/356; 375/215; 375/221; 375/355; 375/373; 375/376; 327/147; 327/152
(58) Field of Classification Search .......... 375/211–226, 375/354–376; 327/5, 2, 1, 9, 16, 90–91, 327/152–153, 50, 100, 141–147
See application file for complete search history.

(56) References Cited

U.S. PATENT DOCUMENTS

| 4,105,973 | A  | * | 8/1978  | Arnold et al. ................. 370/323 |
| 6,509,773 | B2 | * | 1/2003  | Buchwald et al. ............ 327/248 |
| 7,295,644 | B1 | * | 11/2007 | Wu et al. ....................... 375/375 |
| 7,363,563 | B1 | * | 4/2008  | Hissen et al. ................. 714/733 |
| 2004/0213337 | A1 | * | 10/2004 | Li et al. ......................... 375/222 |
| 2005/0207520 | A1 | * | 9/2005  | Su et al. ........................ 375/355 |
| 2005/0238126 | A1 | * | 10/2005 | Ribo et al. .................... 375/355 |

\* cited by examiner

*Primary Examiner* — Dac Ha
*Assistant Examiner* — James M Perez
(74) *Attorney, Agent, or Firm* — Sterne, Kessler, Goldstein & Fox P.L.L.C.

(57) ABSTRACT

A system and method is provided for phase interpolator based transmission clock control. The system includes a transmitter having a phase interpolator coupled to a master timing generator and a transmission module. The phase interpolator is also coupled to a receiver interpolator control module and/or an external interpolator control module. When the system is operating in repeat mode, the transmitter phase interpolator receives a control signal from a receiver interpolator control module. The transmitter phase interpolator uses the signal to synchronize the transmission clock to the sampling clock. When the system is operating in test mode, a user defines a transmission data profile in an external interpolator control module. The external interpolator control module generates a control signal based on the profile. The transmitter phase interpolator uses the signal to generate a transmission clock that is used by the transmission module to generate a data stream having the desired profile.

16 Claims, 8 Drawing Sheets

PHASE INTERPOLATOR BASED TRANSMISSION CLOCK CONTROL

FIELD OF THE INVENTION

The present invention is generally related to communication devices and in particular to a system and method for phase interpolator-based transmitter clock control.

BACKGROUND OF THE INVENTION

In the past decade, there has been a dramatic increase both in processor speeds and in memory capacity. As a result, the need for networks to handle high-speed transfer of large quantities of data among devices has also increased. Transceivers capable of efficiently receiving and transmitting high-speed data are critical components of these high-speed networks.

At a high level, a transceiver includes a transmitter and a receiver. To reliably process a received data signal, the receiver needs to match its operating characteristics with the characteristics of the received data signal. For example, to minimize data recovery errors, a receiver generates a clock signal to sample the received data signal at times that produce optimal data recovery. To achieve this optimal data recovery, the receiver must lock the sampling clock to the clock of the remote transmitter. A clock data recovery (CDR) unit in the receiver recovers the high-speed clock from the data signal and uses this recovered clock as the sampling clock. The transmitter, on the other hand, transmits data using a clock signal that is locked to the output frequency of a local reference clock.

In many applications such as storage networks, communication devices are connected in loop or daisy chain configurations. Transceivers in these communication devices are often required to re-transmit received data not destined for the device. To allow for data recovery at the destination device, the transmission clock signal used by the transmitter to re-transmit the data must be locked to the sampling clock used by the receiver.

One technique to achieve synchronization between the sampling and the transmission clocks within a transceiver is to have two separate CDR units, one for the receiver and one for the transmitter. A typical CDR unit includes a phase locked loop (PLL) having a voltage controlled oscillator (VCO). When multiple PLLs (and VCOs) are implemented in the same transceiver, cross talk between the two VCOs causes intermodulation that in turn degrades the performance of the transceiver. Intermodulation refers to the condition, also known as injection locking, in which one VCO tracks not only its own reference frequency but the frequency of the other VCO. In addition, the use of multiple VCOs increases the power consumption of the transceiver.

In another technique, the recovered sampling clock is transmitted across the transceiver and used by the transmitter as the transmission clock. The transmission of a high-speed clock across the transceiver requires significant power and also increases cross talk. In addition, any jitter in the sampling clock is introduced into the data stream by the transmitter increasing the possibility of data recovery errors at the destination receiver.

These problems are exacerbated in transceivers that have multiple transmitters and multiple receivers. These transceivers are referred to as multiple channel or multi-channel transceivers. In a multi-channel transceiver, each receiver is capable of receiving a separate data signal. Therefore, each receiver must generate a sampling signal locked to the clock of the remote transmitter. Thus, each receiver must have a separate CDR function. When these transceivers are operating in repeat mode, each transmitter must be locked to the sampling clock of the receiver that received the data to be transmitted. If a PLL is needed for each channel of the multi-channel receiver, the power limits of the transceiver will likely be exceeded.

One example of a multi-channel transceiver is a serializer/deserializer or Serdes transceiver. The transmitter in a Serdes transceiver transmits parallel data in serial order and the receiver converts a received serial data stream back into parallel data. One limitation of Serdes transceivers is the difficulty of testing the device. For example, it is desirable to determine the tolerance of a receiver to jitter and noise. Currently, the testing equipment to perform these tests is costly and cannot be used during production. As a result, a complete view of the operation of a transceiver cannot be developed.

Therefore, a need exists for a communications device having a controllable transmission clock.

A further need exists for a communications device having a transmission clock that can be controlled by an external device.

BRIEF SUMMARY OF THE INVENTION

The present invention is directed to a system and method for phase-interpolator based transmission clock control. In accordance with embodiments of the present invention, the transmitter includes a phase interpolator coupled to a master timing generator and a transmission module. The phase interpolator may also be coupled to a receiver interpolator control module and/or an external interpolator control module. The phase interpolator generates a transmission clock using a set of reference signals generated by the master timing generator and an interpolator control signal generated by either the receiver interpolator control module or the external interpolator control module.

In an embodiment of the present invention, when the communications device is operating in repeat mode, the receiver interpolator control module determines the offset between the sampled data stream and the optimal clocking signal. Based on this determination, the interpolator control module generates an interpolator control signal. The receiver interpolator control module then communicates the interpolator control signal to the receiver phase interpolator and the transmitter phase interpolator. The receiver phase interpolator uses the interpolator control signal to generate a clock to sample the received data. The transmitter phase interpolator uses the same interpolator control signal to generate the transmission clock. The transmission clock is then synchronized to the sampling clock.

In an embodiment of the present invention, when the communications device is operating in test mode, the transmitter phase interpolator is controlled by an external interpolator control module. In this embodiment, a user inputs a desired transmission signal profile for one or more transmitters in the communications device. The external interpolator control module generates an interpolator control signal for each transmitter selected by the user. The external interpolator control module communicates each interpolator control signal to the associated transmitter phase interpolator. Each phase interpolator uses the interpolator control signal to generate a transmission clock. The transmission clock is then used by the transmission module to generate a transmission data stream having the desired characteristics.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
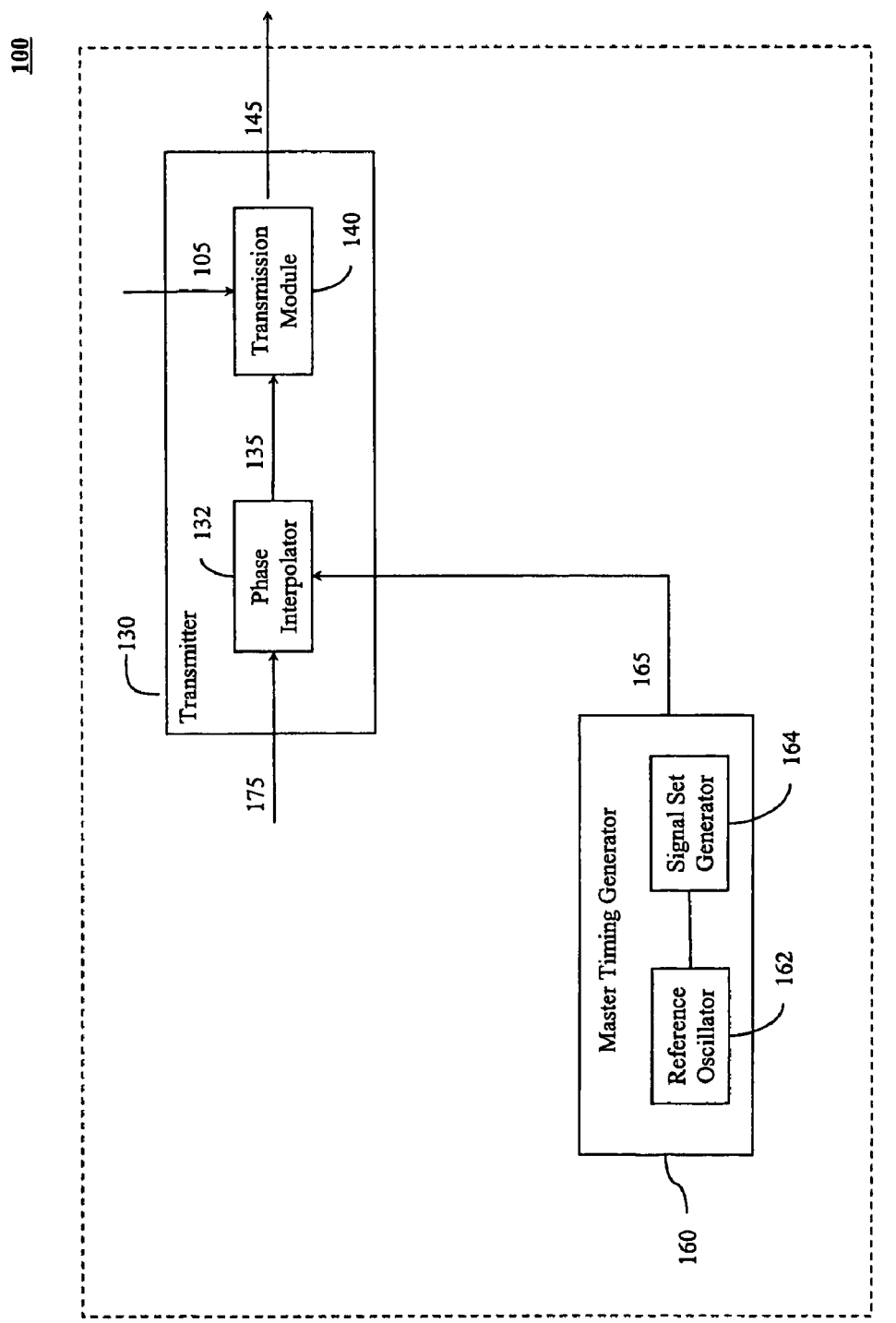
FIG. 1 is a block diagram of an exemplary system for phase interpolator-based transmission clock control in accordance with embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 depicts a block diagram of a system 100 having phase interpolator based transmission clock control in accordance with an embodiment of the present invention. System 100 may be implemented in any communications device having a transmitter. Persons skilled in the relevant arts will recognize that configurations and arrangements other than those provided in FIG. 1 can be used without departing from the spirit and scope of the present invention.

System 100 comprises a transmitter 130 and a master timing generator 160. Transmitter 130 includes a transmission module 140 coupled to a phase interpolator 132. Master timing generator 160 includes a reference oscillator 162 coupled to a signal set generator 164. Master timing generator 160 is configured to generate a set of reference signals 165 used by phase interpolator 132 to generate a transmission clock. The reference signals included in reference set 165 have the same frequency but different predetermined phases. In an illustrative embodiment of the invention, master timing generator 160 is implemented as a ring structure.

Phase interpolator 132 is coupled to the master timing generator 160 and the transmission module 140. Phase interpolator 132 receives an interpolator control signal 175 from an interpolator control module (not shown) and a set of reference signals 165 from the master timing generator 160. Based on these inputs, the phase interpolator 132 generates a transmission clock signal 135 for use by transmission module 140. For example, phase interpolator 132 may generate a transmission clock signal that is synchronized to a sampling clock signal of a receiver. Alternatively, phase interpolator 132 may generate a transmission clock having user defined noise patterns. Transmission module 140 receives an input data stream 105 and utilizes the transmission clock signal 135 to generate transmission data signal 145.

Figure 2:
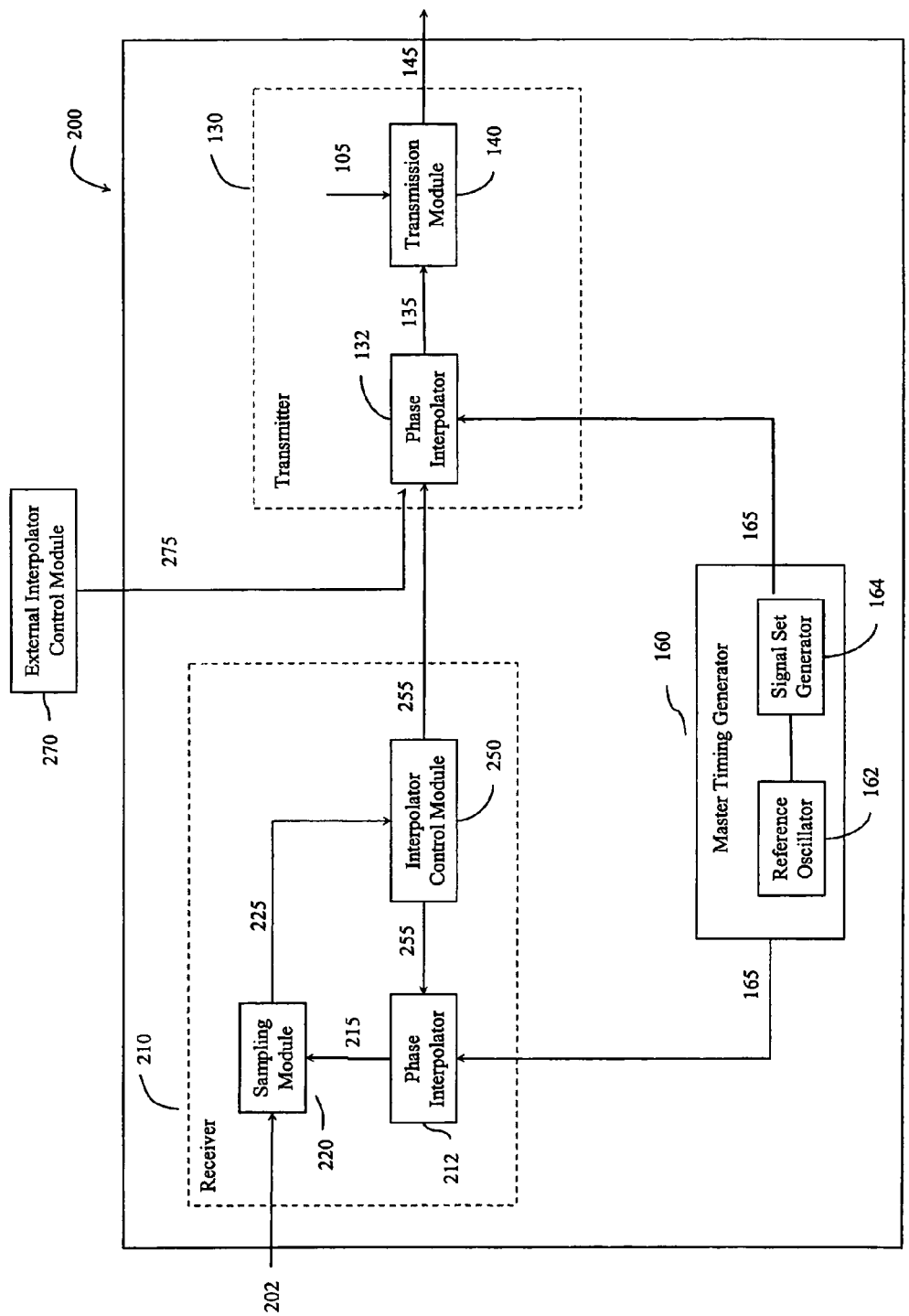
FIG. 2 is a block diagram of an exemplary system for phase interpolator-based transmission clock control in a communication device in accordance with embodiments of the present invention.

FIG. 2 is a block diagram of a communications device 200 having phase interpolator based transmission clock control in accordance with an embodiment of the present invention. Communications device 200 is coupled to an external interpolator control module 270. Communications device 200 includes a receiver 210, a transmitter 130, and a master timing generator 160.

In an embodiment of the present invention, receiver 210 includes clock data recovery (CDR) functionality. CDR functionality can be considered to be distributed between the receiver and the master timing generator. A receiver having CDR functionality can be referred to as a CDR receiver. The CDR receiver has logic to generate a sampling clock synchronized to the transmission clock of the remote transmitter (not shown) that originated the received data stream 202. This sampling clock is often referred to as the "recovered clock." Thus, the CDR receiver generates a sampling clock signal 215 having an optimal sampling position for the received data stream. For a detailed description of one method of performing clock data recovery, see e.g., Buchwald, et al, U.S. Pat. No. 6,509,773, issued Jan. 21, 2003, entitled "Phase Interpolator Device and Method," incorporated herein by reference in its entirety. Persons skilled in the relevant arts will recognize that other configurations and methods for performing clock recovery can be used without departing from the spirit and scope of the present invention.

CDR receiver 210 includes a sampling module 220, a phase interpolator 212, and an interpolator control module 250. Sampling module 220 is coupled to phase interpolator 212 and interpolator control module 250. When a data stream 202 is received by receiver 210, sampling module 220 samples the data using the sampling clock signal 215 generated by phase interpolator 212. In an alternate embodiment, a second sampling signal is generated by phase interpolator 212 such that the second sampling signal is offset in phase from the first sampling signal. In this embodiment, the sampling module samples the data using both sampling signals and produces two sampled streams.

Interpolator control module 250 is coupled to sampling module 220, receiver phase interpolator 212, and transmitter phase interpolator 132. Interpolator control module 250 receives the sampled data stream 225 from sampling module 220. Interpolator control module 250 determines the offset between the sampled data stream and the received data stream. Based on this determination, the interpolator control module 250 generates an interpolator control signal 255 to set receiver phase interpolator 212 to the optimal clocking position for recovering data from the received data stream 202. When the communications device 200 is operating in repeat mode, the interpolator control module 250 communicates the generated interpolator control signal 255 to the transmitter phase interpolator 132.

Receiver phase interpolator 212 derives sampling signal 215 based on the interpolator control signal 255 and the set of reference signals 165 generated by the master timing generator 160. Similarly, the transmitter phase interpolator 132 derives the transmission clock signal 135 based on the same interpolator control signal 255 and set of reference signals 165 used by receiver phase interpolator 212 in generating the sampling signal. In this way, both the sampling signal 215 (i.e., recovered clock) and the transmission clock signal 135 are synchronized to the transmission clock of the remote transmitter of the received data 202 and to each other.

Figure 3:
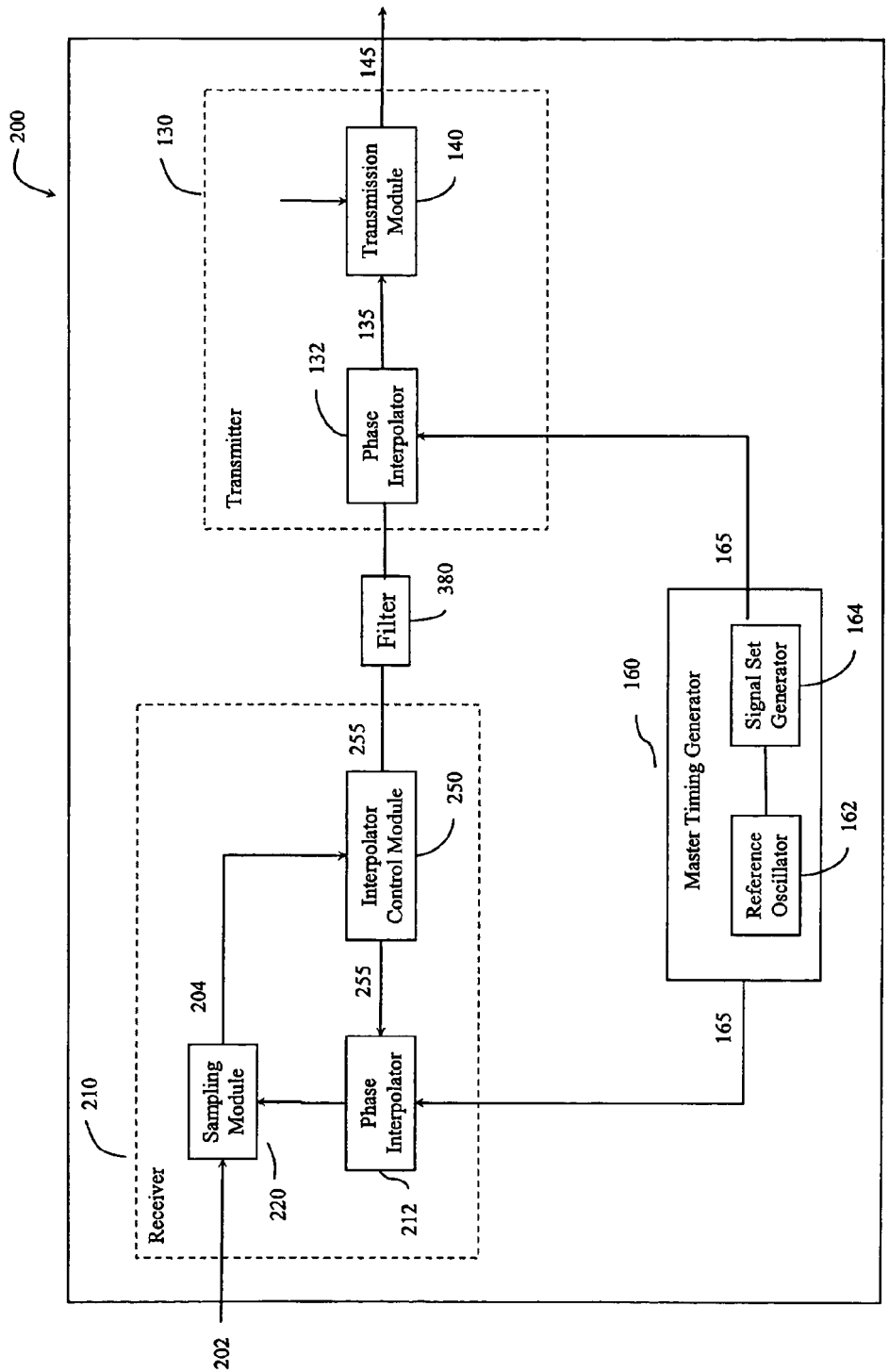
FIG. 3 is a block diagram of an alternative embodiment of a system for phase interpolator-based transmission clock control in a communication device in accordance with embodiments of the present invention.

As depicted in FIG. 2, the CDR functionality of receiver 210 includes a feedback loop. Because of the inherent loop dynamics, the CDR receiver can respond to changes in the received data and adjust the sampling signal accordingly. While jitter is acceptable in a recovered receiver sampling clock, using the same jittery clock as a transmission clock causes data recovery problems. Therefore, in an alternate embodiment of the invention depicted in FIG. 3, a filter 380 is coupled between the interpolator control module 250 and the transmitter phase interpolator 132. The filter 380 receives the interpolator control signal and filters the signal to remove any jitter introduced by the clock data recovery process in receiver 210.

Returning to FIG. 2, transmitter phase interpolator 132 can also be coupled to an external interpolator control module 270. External interpolator control module 270 has logic to generate an interpolator control signal 275 based on user defined criteria. For example, a user may wish to introduce a defined pattern into the transmission data signal 145 for device testing purposes. Based on the desired transmission signal profile entered by the user, the external interpolator control module 270 generates a control signal 275 to set phase interpolator 132. Phase interpolator 132 uses the control signal 275 and the set of reference signals 165 generated by the master timing generator 160 to generate a transmission signal having the desired characteristics.

While FIG. 2 depicts a transmitter phase interpolator 132 coupled to both a CDR receiver interpolator control module 250 and an external interpolator control module 270, persons skilled in the relevant arts will recognize that the present invention may contain only one or both of these interpolator control modules.

Communications device 200 is capable of operating in several modes including repeat mode, test mode, and normal mode. In repeat mode, the transmitter phase interpolator receives control signals from the interpolator control module in the receiver. The transmission clock is then synchronized with the recovered sampling clock of the receiver. In test mode, the transmitter phase interpolator receives control signals from an external interpolator control module. The transmission clock can then be changed to modify the characteristics of the transmitted data stream for testing. In normal mode, the transmitter phase interpolator does not receive control signals from either the receiver or external interpolator control module (or the transmitter phase interpolator is set to no input). The transmission clock is then based on the local reference clock. Repeat mode and test mode are described in detail below.

Figure 4:
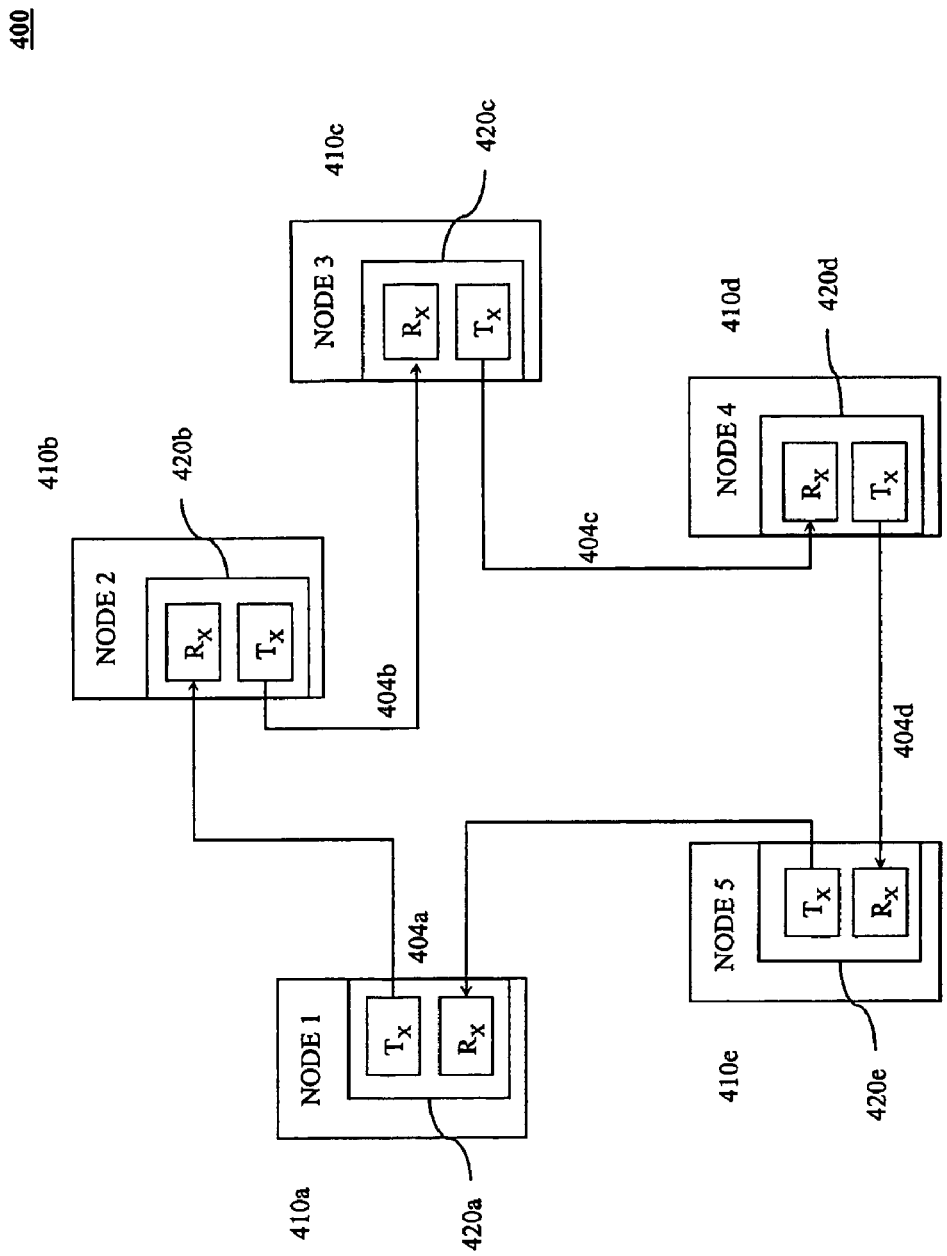
FIG. 4 illustrates a network loop architecture including communications device operating in repeat mode.

Before discussing the operation of repeat mode, it is helpful to describe an example environment in which repeat mode may be used. Repeat mode is particularly useful in loop architectures (e.g., fibre channel loops) such as are used in storage network applications. FIG. 4 illustrates an loop architecture environment using repeat mode in accordance with the present invention. As shown in FIG. 4, loop architecture 400 includes multiple nodes 410a, 410b, 410c, 410d, and 410e. Each node includes one or more transceivers 420.

In the loop architecture 400, any node 410 can originate a data transmission to another node in the loop. For example, node 410a can originate a data transmission to node 410e. The transmitter in node 410a transmits the data in a data signal 404a to the receiver in the next node in the loop, node 410b. The transmitter in node 410a uses a local clock to generate data signal 404a. Because the data is not destined for node 410b, the transmitter in node 410b re-transmits the received data in data stream to the next node in the loop, node 410c. This process continues until the data reaches the designated node 410e. The intermediate nodes between the originator node 410a and the destination node 410e function as repeaters in this scenario. The operation of the intermediate nodes is also referred to as "repeat mode."

To minimize errors in data recovery at the destination node, the sampling clock used by the receiver in node 410e should be synchronized with the clock used in the original transmitter to transmit the data. In order to achieve this, the transmitter in each node operating in repeat mode should repeat the data using a clock synchronized with the original transmitter clock.

Figure 5:
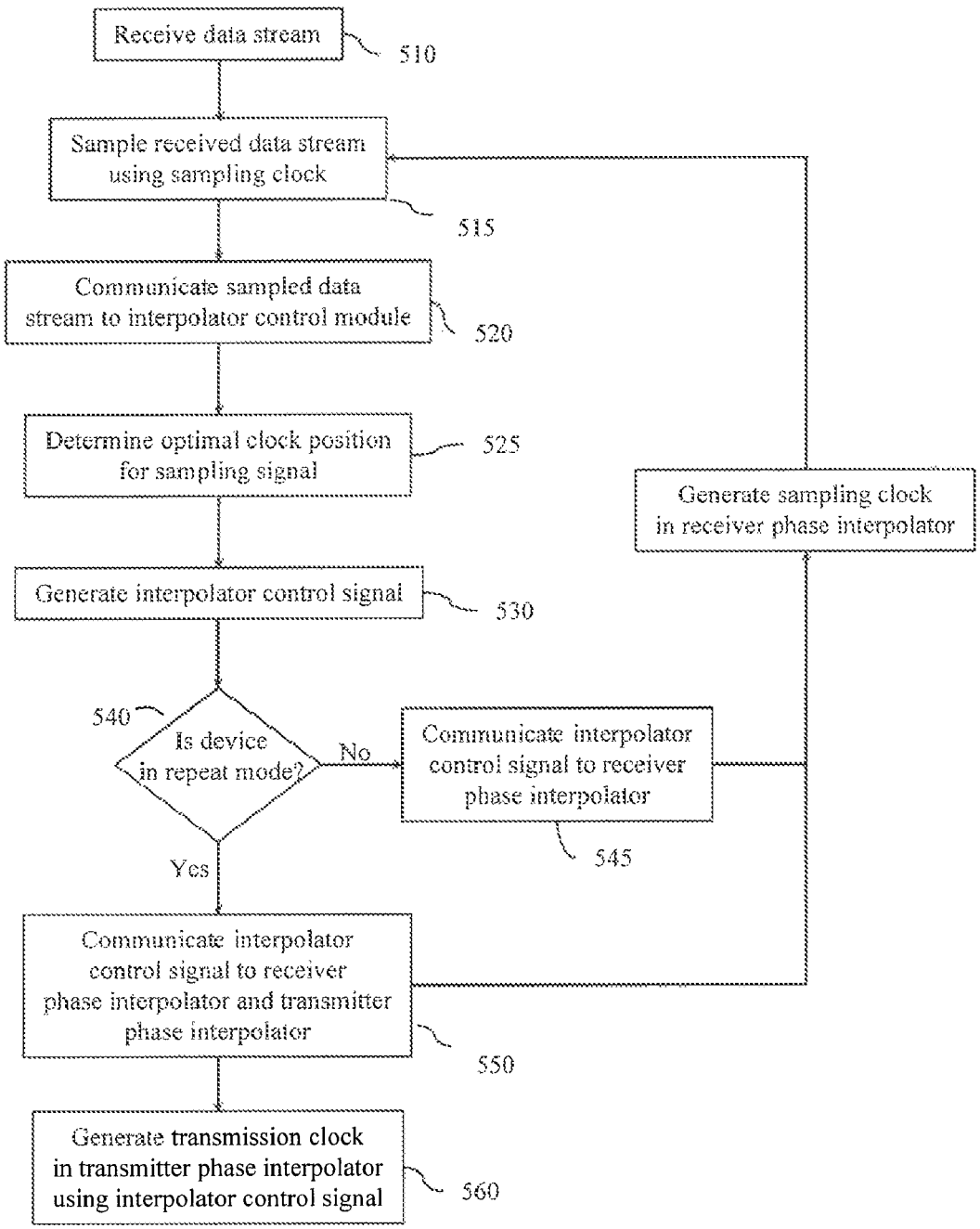
FIG. 5 is a flowchart illustrating a method for phase interpolator based transmission clock control in a transceiver operating in repeat mode in accordance with an embodiment of the present invention.

FIG. 5 depicts a flowchart 500 of a method for phase interpolator based transmission clock control in a transceiver operating in repeat mode in accordance with an embodiment of the present invention. The flowchart 500 will be described with continued reference to the example communications device 200 described in reference to FIG. 2, above. However, the invention is not limited to that embodiment.

The method of flowchart 500 begins at step 510 in which receiver 210 receives a data stream from a transmitter. In step 515, the sampling module 220 samples the received data based on the sampling clock generated by receiver phase interpolator 212. The sampled data signal 225 is communicated to the interpolator control module 250 (step 520). The interpolator control module 250 uses the sampled data stream to determine the optimal clock position for the sampling signal (step 525). Based on this determination, the interpolator control module 250 generates an interpolator control signal 255 (step 530).

In step 540, the communication device determines whether the device is operating in repeat mode. If the device is not operating in repeat mode, the interpolator control signal 255 is only used by the receiver phase interpolator 212 to generate sampling signal 215. In step 545, the interpolator control signal 255 is communicated to the receiver phase interpolator 212. If the device is operating in repeat mode, the interpolator control signal 255 is also communicated to the transmitter phase interpolator 132 (step 550). In an embodiment of the present invention, the interpolator control module 250 may first communicate the control signal 255 to a filter 280 prior to delivery to the transmitter phase interpolator. As would be understood by persons skilled in the relevant art(s), steps 545 and 550 can be performed in any order or simultaneously.

In alternate embodiments of the invention, the receiver interpolator control module 250 always communicates the interpolator control signal 255 to both the transmitter phase interpolator 132 and the receiver phase interpolator 212. The transmitter phase interpolator 132 only uses the received interpolator control signal 255 when the communications device is operating in repeat mode.

In step 560, the transmitter phase interpolator 132 generates a transmission clock using the interpolator control signal 255 and the set of reference signals 165 generated by the master timing generator 160. The transmission module uses the transmission clock signal to generate the transmission data stream. Because the transmission clock is synchronized with the sampling clock that is in turn synchronized to the transmission clock of the remote transmitter, the remote receiver will be able to recover the data stream with minimal recovery errors.

Figure 6:
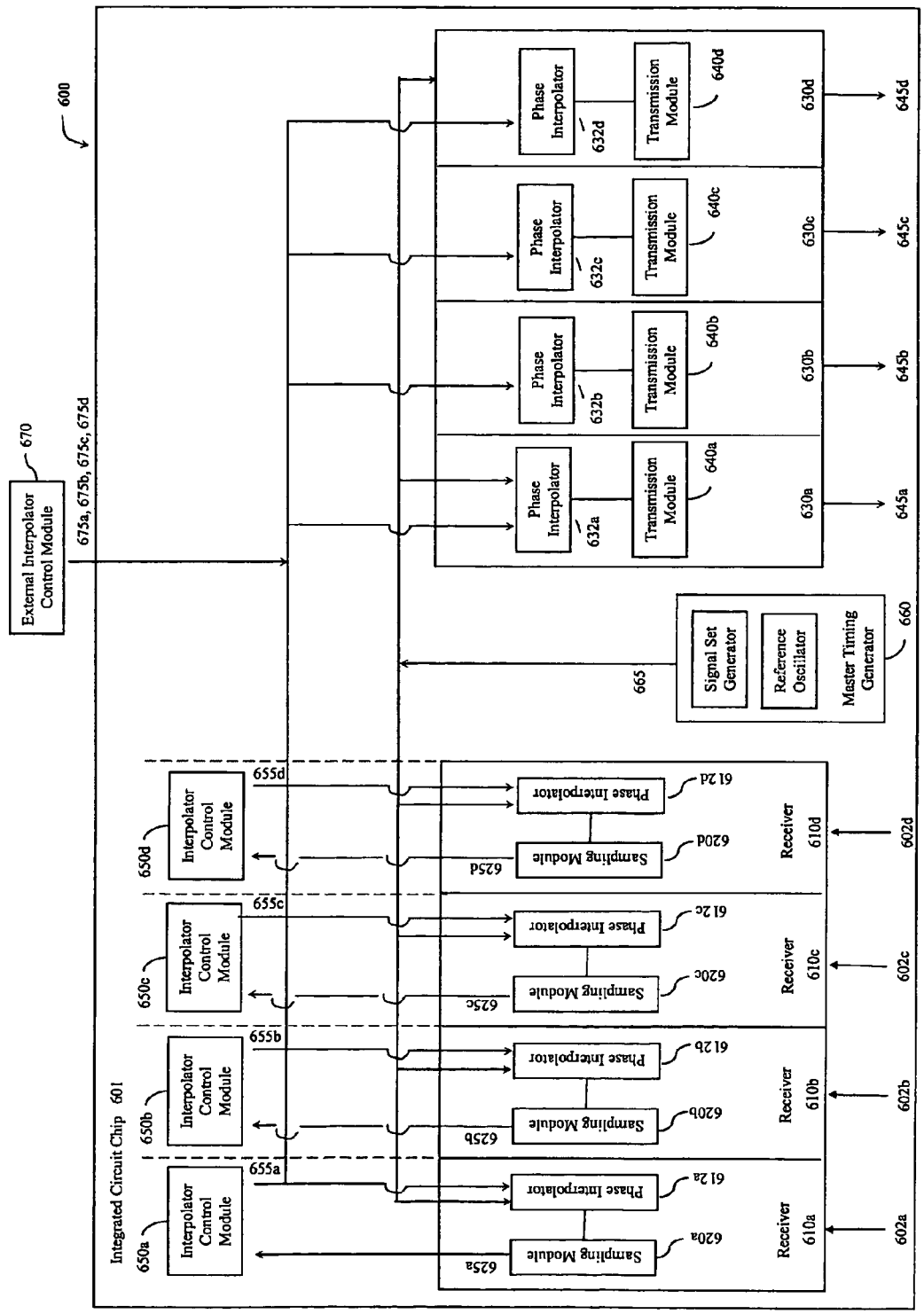
FIG. 6 is a block diagram of an exemplary multiple channel communication device constructed on an integrated circuit (IC) chip having independent phase interpolator based clock transmission control in each transmitter, in accordance with an embodiment of the present invention.

FIG. 6 is an illustration of an example multiple channel communications device 600 constructed on an integrated circuit (IC) chip 601 having phase interpolator based transmission clock control, according to an embodiment of the present invention. Communication device 600 includes multiple receivers 610a, 610b, 610c, and 610d and multiple transmitters 630a, 630b, 630c, and 630d. In an alternate embodiment of the invention, communications device 600 includes more or fewer receivers and transmitters. Each of the receivers 610 receives a corresponding one of multiple data signals 602, as depicted in FIG. 6.

Communication device 600 includes a master timing generator 660 for generating a master timing signal. Master timing generator 660 includes a reference oscillator 662 coupled to a signal set generator 664. Master timing generator 660 provides a set of reference signals 665 to each of the multiple receivers 610 and to each of the multiple transmitters 630. While the master timing generator is described as including a reference oscillator and a signal set generator, other timing generators which produce a set of reference signals can be used without departing from the spirit or scope of the present invention.

In an embodiment of the present invention, each of the receivers 610 includes clock data recovery (CDR) functionality, as described above in reference to the receiver of FIG. 2. Each of the receivers is associated with separate CDR functionality. Thus, the CDR function of one receiver operates independently of the CDR function of the other receivers. This means the CDR function associated with receiver 610a tracks the characteristics of data signal 602a (e.g., phase and frequency), while the CDR function associated with receiver 610b tracks characteristics data signal 602b, and so on. For example, interpolated phases of the sampling signals associated with receiver 610a can be rotated independently of and at a rate different from the interpolated phases of the sampling signals associated with the other receivers 610b-c.

Each CDR receiver includes a sampling module 620, a phase interpolator 612, and an interpolator control module 650. In an alternate embodiment, the interpolator control module 650 is not included in the receiver. For example, in an embodiment, interpolator control modules 650a, 650b, 650c, and 650d can be included in a separate data processing module. Phase interpolator 612 generates a sampling signal based on signals from its associated interpolator control module 650 and the common set of reference signals 665 generated by the master timing generator 660. Using the recovered clock, each receiver 610 processes the corresponding one of data signals 602 to produce a corresponding one of sampled data streams 625a, 625b, 625c, and 625d. Each sampled data stream 625 is communicated to the associated interpolator control module 650.

Each interpolator control module 650 is coupled to an associated receiver phase interpolator 612 and one or more transmitter phase interpolators 632a, 632b, 632c, and 632d. As described above, the interpolator control module 650 generates an interpolator control signal to set the associated receiver phase interpolator to the optimal clocking position for recovering the received data stream. When communications device is operating in repeat mode, a transmitter 630 is re-transmitting the data received and sampled by one of the receivers. In repeat mode, the interpolator control module 650 also communicates the interpolator control signal to the transmitter phase interpolator 632 re-transmitting the sampled data stream.

In an embodiment of the invention, communications device 600 is also coupled to an external interpolator control module 670. The external interpolator control module 670 is coupled to one or more transmitter phase interpolators 632. External interpolator control module 670 has logic to generate one or more interpolator control signals 675a-d based on user defined criteria. For example, to test operations of a multi-channel receiver, a user may which to generate multiple transmission data streams, each having different characteristics. In this example, the external interpolator control module 670 can generate a separate interpolator control signal 675 for each transmitter phase interpolator 632. Each transmitter phase interpolator 632 will use the received control signal designated for it and the set of reference signals 665 generated by the master timing generate a transmission signal having the desired characteristics.

Figure 7A:
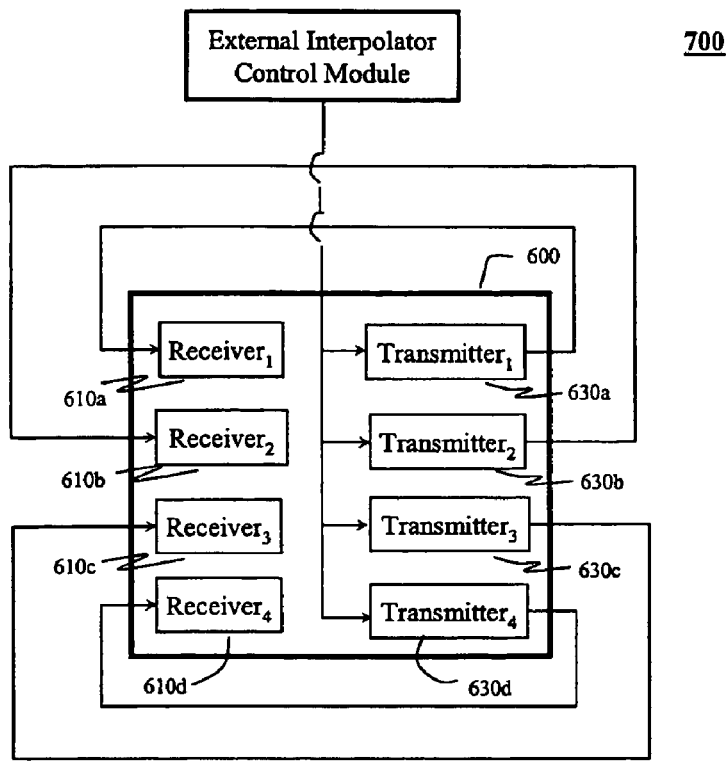
FIGS. 7A and 7B are block diagrams illustrating exemplary testing configurations for a communications device operating in test mode.
Figure 7B:
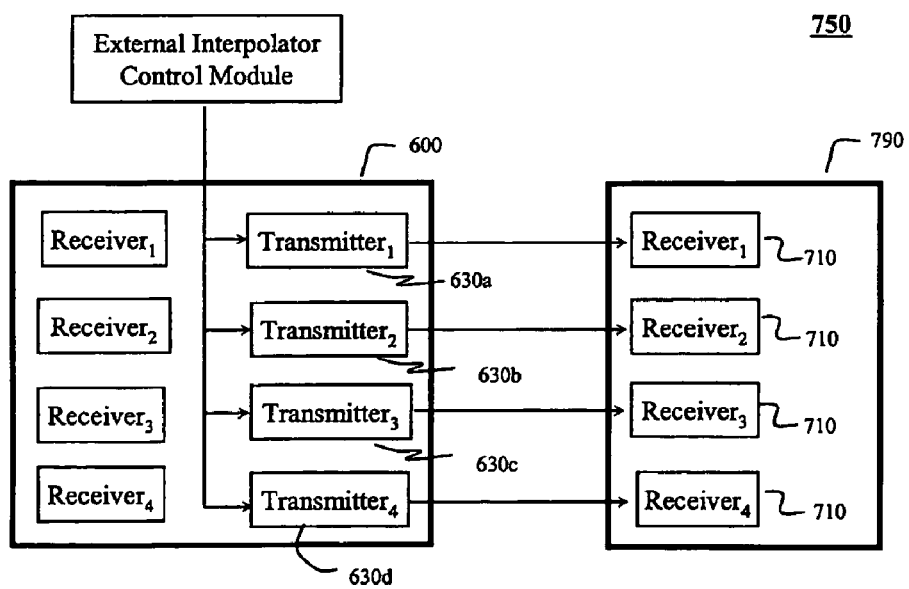

Test mode overcomes many difficulties inherent in testing receivers particularly multi-channel receivers. Therefore, test mode will be described in continued reference to a multi-channel receiver having phase interpolator based transmission clock control for each channel. FIGS. 7A and 7B are block diagrams of example environments in which communications device 600 operating in test mode may be used.

FIG. 7A depicts a communications device 600 in a loopback testing environment 700. In this embodiment, the transmission data streams generated by each transmitter are looped back as input to the receivers, as shown. The transmission data stream generated by transmitter 630a is input into receiver 610a, the transmission data stream generated by transmitter 630b is input into receiver 610b, and so on. FIG. 7B depicts a communications device 600 in a series testing environment 750. Communications device 600 is coupled in series to a receiver 790. Receiver 790 may be any communications device (including communications device 600) having one or more receivers. In this embodiment, the transmission data stream generated by a transmitter 630 is input into a receiver 710 in the receiver 790.

Figure 8:
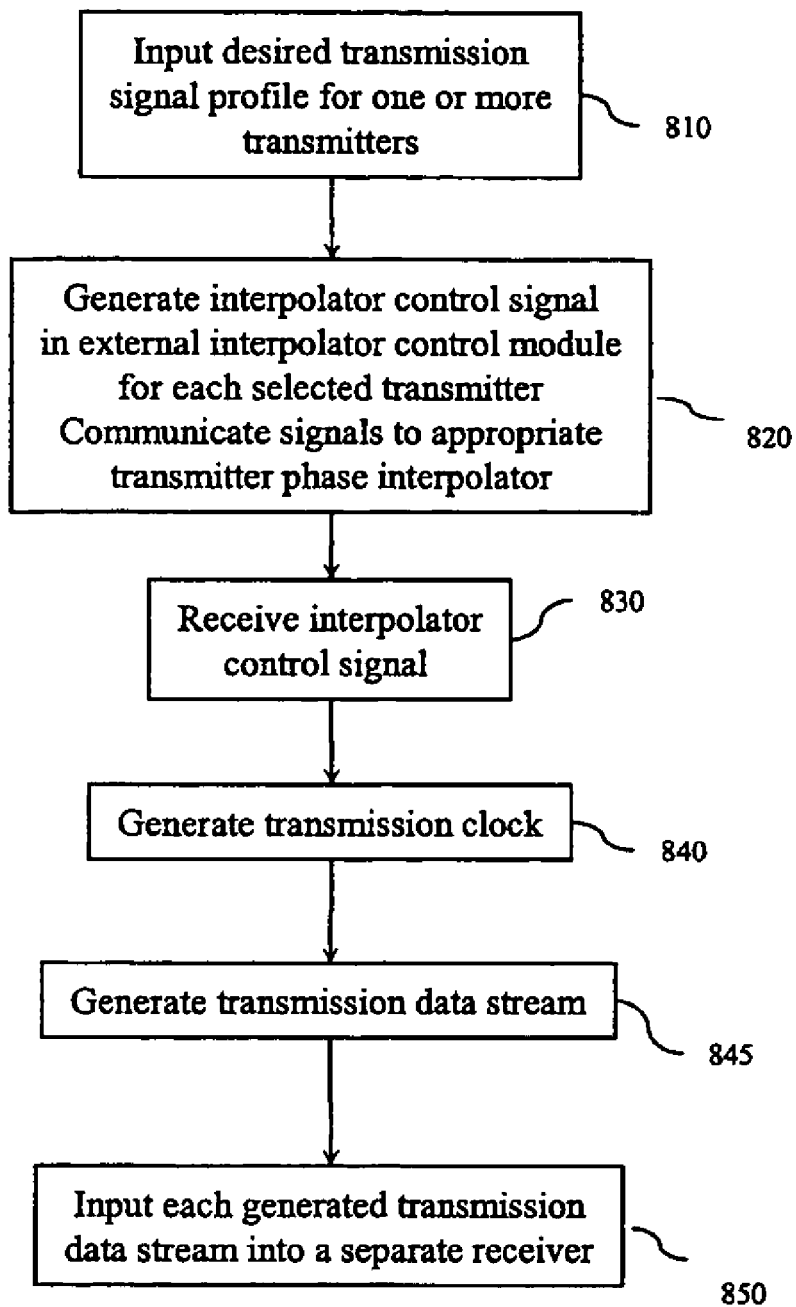
FIG. 8 is a flowchart illustrating a method for phase interpolator based transmission clock control in a transceiver operating in test mode in accordance with an embodiment of the present invention.

FIG. 8 depicts a flowchart 800 of a method for phase interpolator based transmission clock control in a transceiver operating in test mode in accordance with an embodiment of the present invention. The flowchart 800 will be described with continued reference to example communications device 600 described above in reference to FIG. 6. However, the invention is not limited to that embodiment.

The method of flowchart 800 begins at step 810 in which a user inputs a desired transmission signal profile for one or more transmitters 630. In step 820, the external interpolator control module 670 generates a interpolator control signal 675 for each transmitter selected by the user. The external interpolator control module 670 communicates each interpolator control signal 675 to the appropriate transmitter phase interpolator 632. For example, if the user inputs two transmission signal profiles, the external interpolator control module will generate two interpolator control signals 675a and 675b. The external interpolator control module communicates signal 675a to transmitter phase interpolator 632a and signal 675b to transmitter phase interpolator 632b.

In step 830, one or more transmitter phase interpolators 632 receives an interpolator control signal 675. In each transmitter receiving an interpolator control signal, the transmitter phase interpolator 632 generates a transmission clock using the interpolator control signal 675 and the set of reference signals 665 generated by the master timing generator (step 840). In step 845, the transmission module then uses the transmission clock signal to generate the transmission data stream. Each generated transmission data stream then has the characteristics input by the user.

In step 850, each generated transmission data stream is input into a separate receiver. This may be done in a loop-back configuration, as shown in FIG. 7A, in a series configuration, as shown in FIG. 7B, or in another testing configuration. The user then tests the receiver using the appropriate testing equipment. For example, the user may repeat method 800 for different types of jitter in transmission data stream to generate a jitter tolerance template for the receiver.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for controlling generation of a transmission clock, comprising:
   a master timing generator;
   an interpolator control module;
   a plurality of transmitters, wherein each transmitter includes a transmitter phase interpolator coupled to the master timing generator, and wherein each transmitter phase interpolator is configured to receive an interpolator control signal from the interpolator control module, to receive a set of reference signals from the master timing generator, and to generate a transmission clock using the interpolator control signal and the set of reference signals; and
   a plurality of receivers, wherein each receiver includes a receiver phase interpolator coupled to the interpolator control module, wherein each receiver phase interpolator is configured to receive the interpolator control signal from the interpolator control module, to receive the set of reference signals from the master timing generator, and to generate at least one sampling signal using the interpolator control signal and the set of reference signals.

2. The system of claim 1, further comprising:
   an external interpolator control module coupled to a transmitter in the plurality of transmitters.

3. The system of claim 2, wherein the external interpolator control module is configured to generate a second interpolator control signal based on user defined criteria and to provide the second interpolator control signal to each transmitter phase interpolator to generate the transmission clock using the second interpolator control signal and the set of reference signals.

4. The system of claim 3, wherein the user defined criteria includes a desired transmission signal profile entered by a user.

5. The system of claim 3, wherein the system is configured to operate in modes including a repeat mode, a test mode, and a normal mode,
   wherein each transmitter phased interpolator is configured to generate the transmission clock based on the interpolator control signal received from the interpolator control module in the repeat mode,
   wherein, each transmitter phase interpolator is configured to generate the transmission clock based on the second interpolator control signal in the test mode, and
   wherein each transmitter phase interpolator is configured to generate the transmission clock based on a local reference clock in the normal mode.

6. The system of claim 1, wherein each receiver comprises:
   a sampling module coupled to the respective receiver phase interpolator and the interpolator control module, wherein each receiver phase interpolator is configured to receive a set of reference signals from the master timing generator and to generate a first sampling signal and a second sampling signal as the at least one sampling signal.

7. The system of claim 1, wherein each receiver further comprises:
   a sampling module configured to receive a data stream, to receive the at least one sampling signal, and to generate a sampled data stream of the received data stream based on the at least one sampling signal.

8. The system of claim 7, wherein the interpolator control module is configured to receive the sampled data stream, and to generate the interpolator control signal based an offset between the sampled data stream and the received data stream.

9. The system of claim 1, wherein the plurality of transmitters includes a source transmitter and an intermediate transmitter,
   wherein the plurality of receivers includes a destination receiver and an intermediate receiver, and
   wherein the source transmitter is configured to communicate with the destination receiver either directly or via the intermediate transmitter and the intermediate receiver.

10. The system of claim 9, wherein a sampling clock of the destination receiver is synchronized with a transmission clock of the source transmitter.

11. The system of claim 1, wherein a first receiver from among the plurality of receivers is configured to receive a first data stream and to track a first characteristic of the first data stream,
   wherein a second receiver from among the plurality of receivers is configured to receive a second data stream and to track a second characteristic of the second data stream, and
   wherein the first receiver is configured to track the first characteristic independently from the tracking of the second characteristic by the second receiver.

12. The system of claim 11, wherein the first characteristic includes a first phase or a first frequency of the first data stream, and
   wherein the second characteristic includes a second phase or a second frequency of the second data stream.

13. A method for controlling a plurality of transmission clocks, comprising:
   sampling a plurality of received data streams in a plurality of receivers, wherein each receiver samples one of the plurality of received data streams using a first sampling signal and a second sampling signal, wherein the second sampling signal and the first sampling signal are synchronized to a clock of a transmitter that produced the received data stream, and wherein the second sampling signal is offset in phase from the first sampling signal;
   in each receiver, generating one of a plurality of interpolator control signals using one of the sampled data streams, wherein each receiver is associated with one of a plurality of transmitter phase interpolators;

receiving the plurality of interpolator control signals in the plurality of transmitter phase interpolators, wherein each transmitter phase interpolator receives, from a respective receiver, a respective interpolator control signal in the plurality of interpolator control signals from a respective receiver;

receiving the respective interpolator control signal in a respective receiver phase interpolator;

receiving a set of reference signals in the plurality of transmitter phase interpolators; and in each transmitter phase interpolator, generating a transmission clock using the interpolator control signal and the set of reference signals.

14. The method of claim 13, further comprising:

receiving the set of reference signals in a receiver of the plurality of receivers.

15. A method for controlling a plurality of transmission clocks, comprising:

receiving criteria for a plurality of transmission data streams;

generating a plurality of interpolator control signals using the criteria and using first sampling signals and second sampling signals, wherein each second sampling signal and a corresponding first sampling signal are synchronized to a clock of a transmitter that produced a corresponding received data stream, wherein each second sampling signal is offset in phase from the corresponding first sampling signal; signal, and wherein each interpolator control signal is associated with one of a plurality of transmitter phase interpolators;

receiving the plurality of interpolator control signals in the plurality of transmitter phase interpolators, wherein each transmitter phase interpolator receives, from a respective receiver, a respective interpolator control signal in the plurality of interpolator control signals;

receiving the interpolator control signal in a receiver phase interpolator;

receiving a set of reference signals in the plurality of transmitter phase interpolators; and in each transmitter phase interpolator, generating a transmission clock using the interpolator control signal and the set of reference signals.

16. The method of claim 15, further comprising:

receiving the set of reference signals in a plurality of receivers.

\* \* \* \* \*

UNITED STATES PATENT AND TRADEMARK OFFICE
CERTIFICATE OF CORRECTION

| | |
|---|---|
| PATENT NO. | : 8,050,373 B2 |
| APPLICATION NO. | : 10/876602 |
| DATED | : November 1, 2011 |
| INVENTOR(S) | : Buchwald et al. |

Page 1 of 1

It is certified that error appears in the above-identified patent and that said Letters Patent is hereby corrected as shown below:

At column 9, line 64, "transmitter phased interpolator" should be replaced with --transmitter phase interpolator--.

At column 10, line 23, "based an offset" should be replaced with --based on an offset--.

At column 12, line 5, "first sampling signal; signal, and wherein" should be replaced with --first sampling signal, and wherein--

Signed and Sealed this
Thirty-first Day of January, 2012

David J. Kappos
*Director of the United States Patent and Trademark Office*